D. CARTER.
STAMP AFFIXING MACHINE.
APPLICATION FILED JULY 2, 1908.

933,158.

Patented Sept. 7, 1909.
12 SHEETS—SHEET 1.

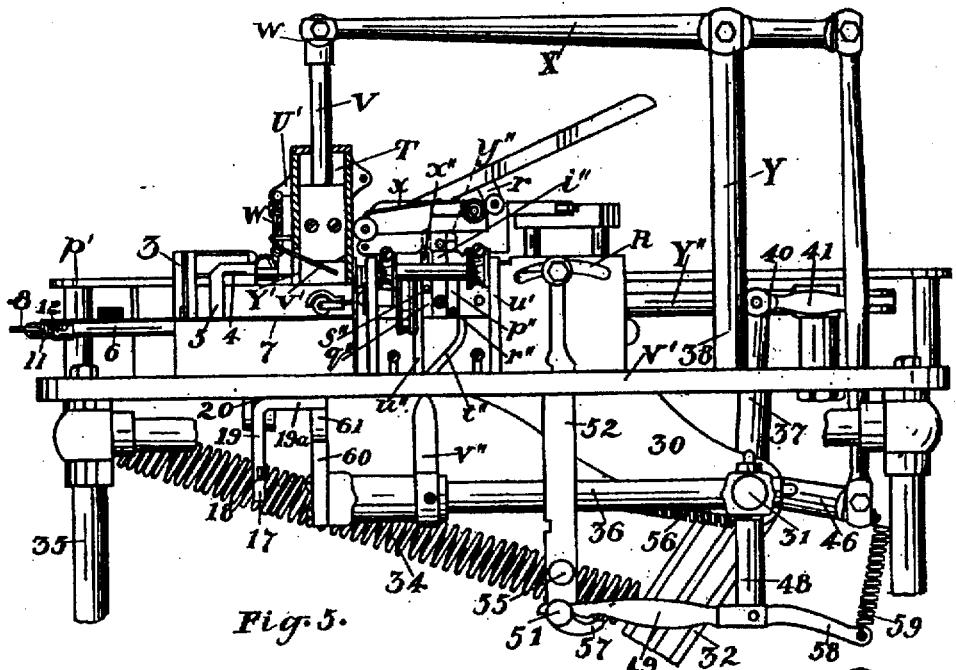

D. CARTER.
STAMP AFFIXING MACHINE.
APPLICATION FILED JULY 3, 1908.

933,158.

Patented Sept. 7, 1909.
12 SHEETS—SHEET 6.

D. CARTER.
STAMP AFFIXING MACHINE.
APPLICATION FILED JULY 3, 1908.
933,158.
Patented Sept. 7, 1909.
12 SHEETS—SHEET 8.
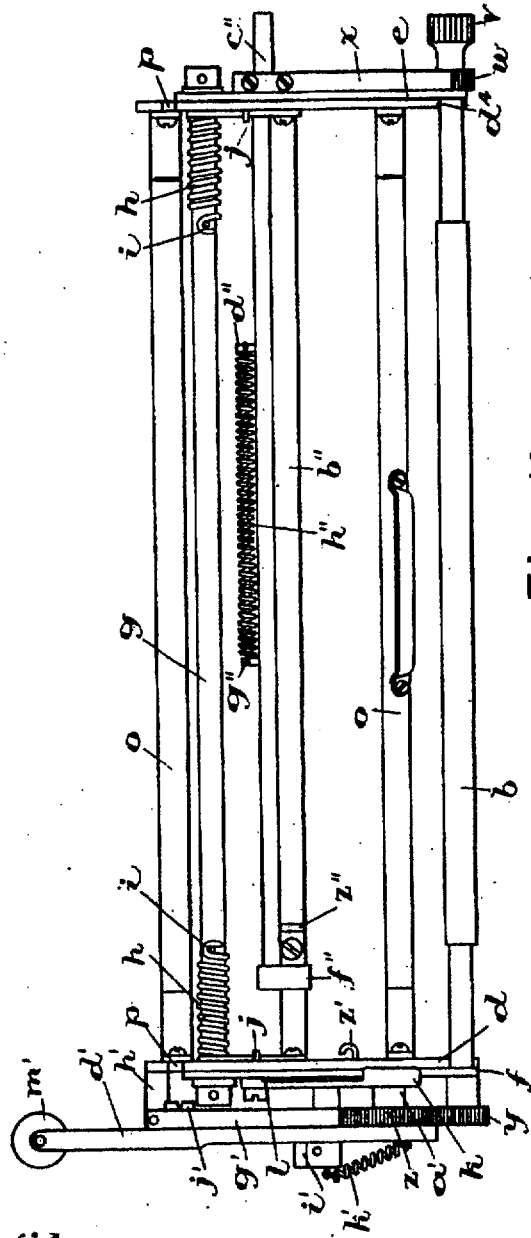
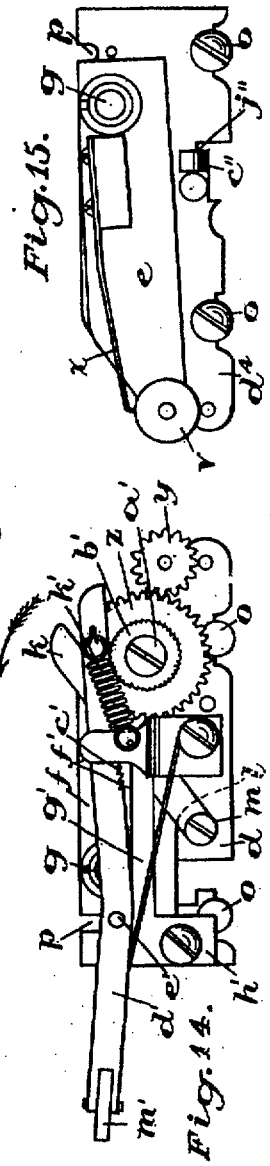
Witnesses.
H. C. Trumble
H. A. Robertson
Inventor.
Daniel Carter
by C. H. Riches
his attorney

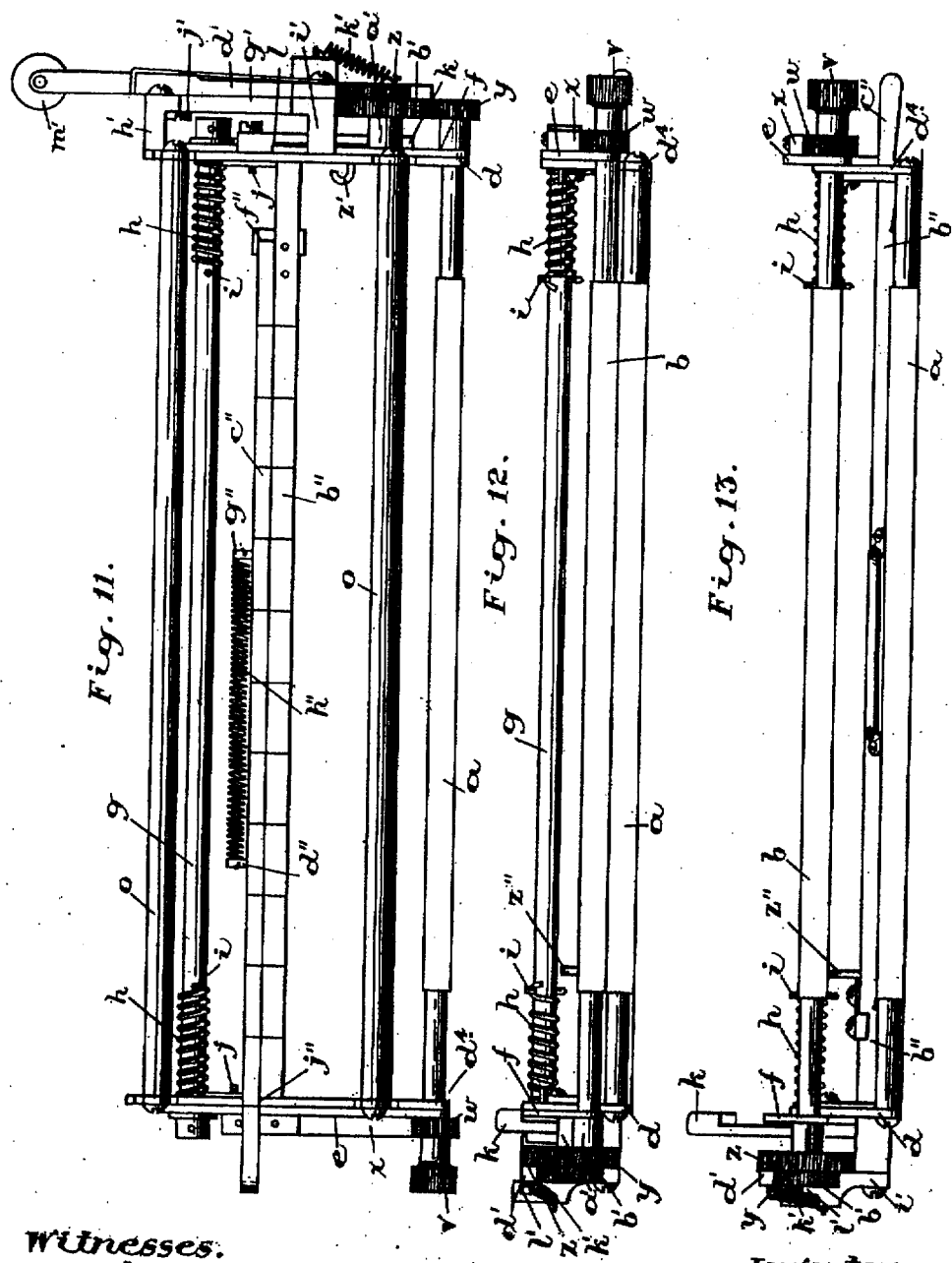

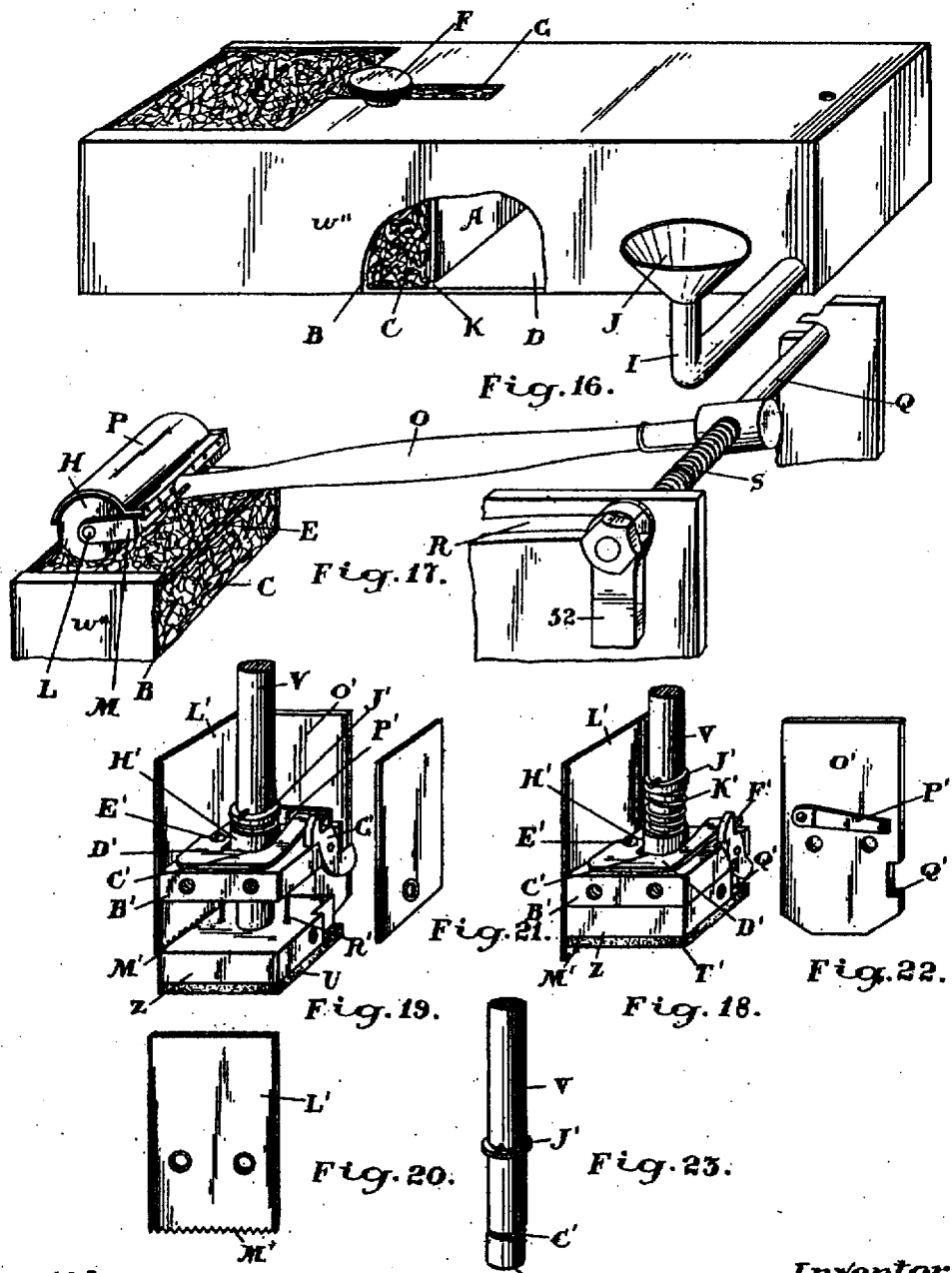

D. CARTER.
STAMP AFFIXING MACHINE.
APPLICATION FILED JULY 3, 1908.
933,158.
Patented Sept. 7, 1909.
12 SHEETS—SHEET 11.
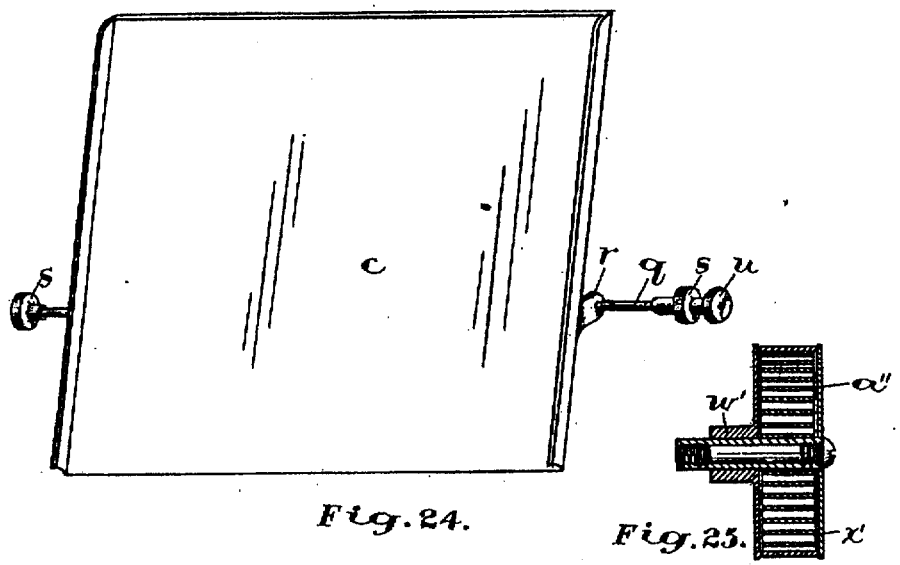
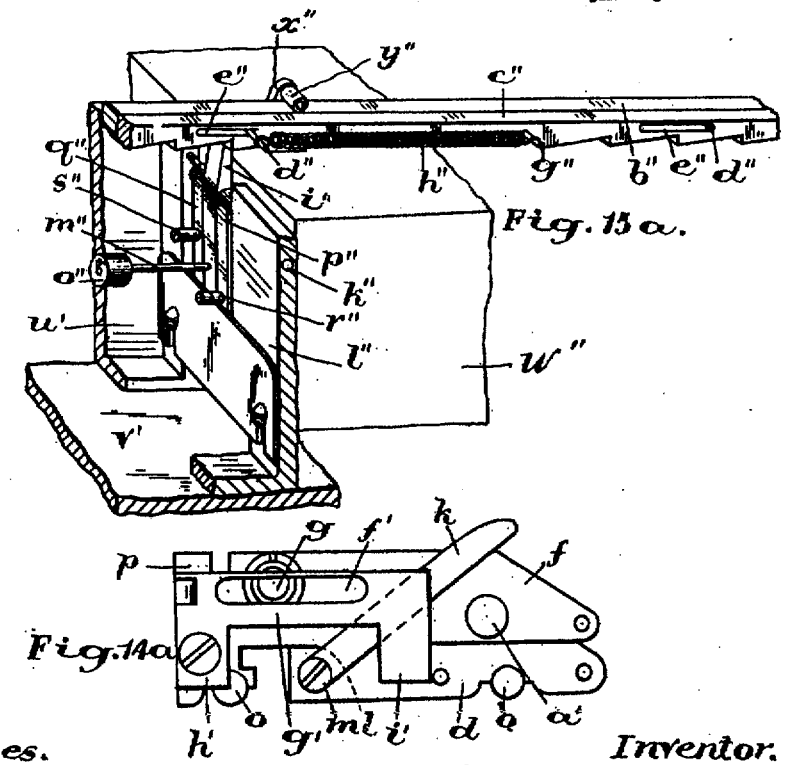

D. CARTER.
STAMP AFFIXING MACHINE.
APPLICATION FILED JULY 3, 1908.

933,158.

Patented Sept. 7, 1909.
12 SHEETS—SHEET 12.

UNITED STATES PATENT OFFICE.

DANIEL CARTER, OF TORONTO, ONTARIO, CANADA.

STAMP-AFFIXING MACHINE.

933,158.  Specification of Letters Patent.  Patented Sept. 7, 1909.

Application filed July 3, 1908. Serial No. 441,780.

*To all whom it may concern:*

Be it known that I, DANIEL CARTER, of the city of Toronto, in the county of York and Province of Ontario, Canada, have invented certain new and useful Improvements in Stamp-Affixing Machines; and I hereby declare that the following is a full, clear, and exact description of the same.

In my application for Letters Patent of the United States, filed January 8th, 1906, Serial Number 295,197, I have shown and described a stamp affixing machine comprising a stamp moistening apparatus, a stamp severing and affixing mechanism means for successively presenting the stamps to the stamp severing and affixing mechanism.

The present invention relates to certain new and useful improvements in these features, and other added features, as hereinafter described.

Figure 1:
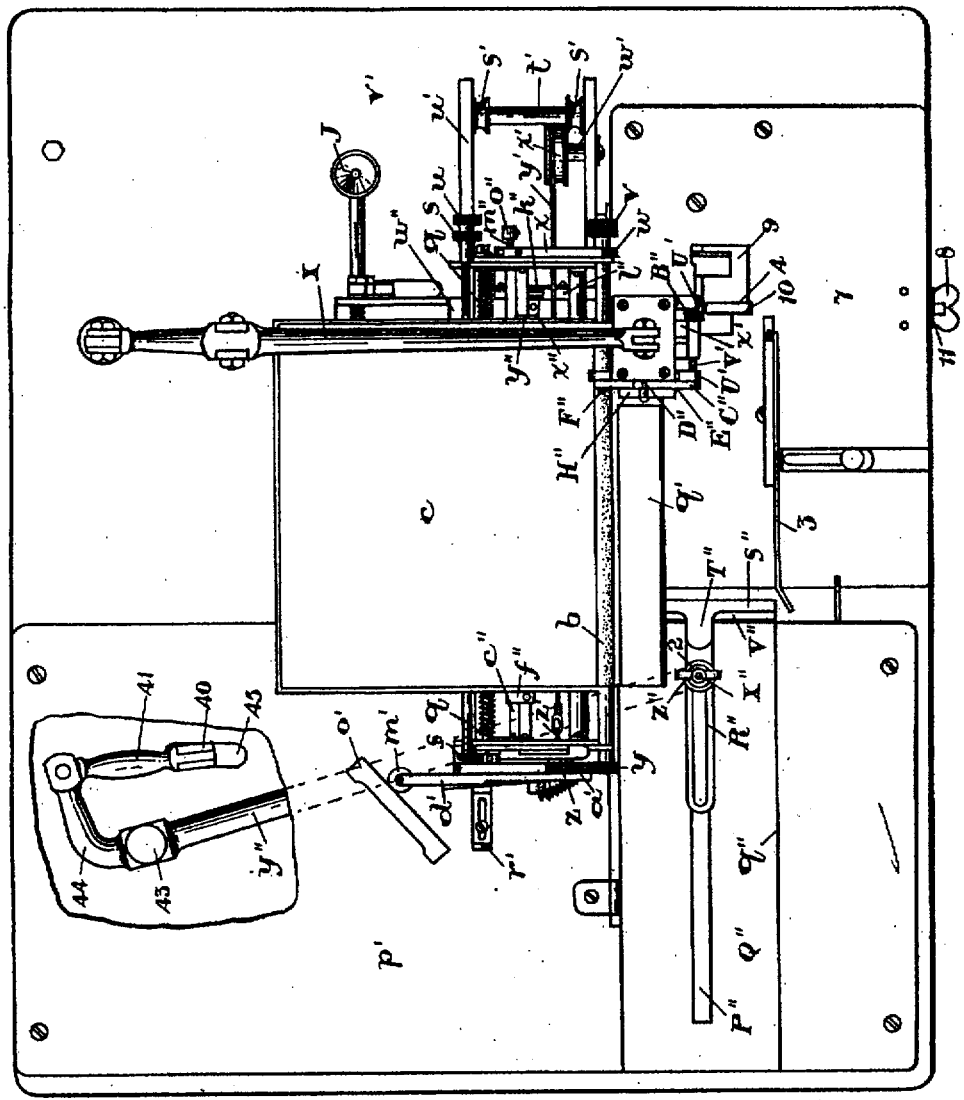
Figure 2:
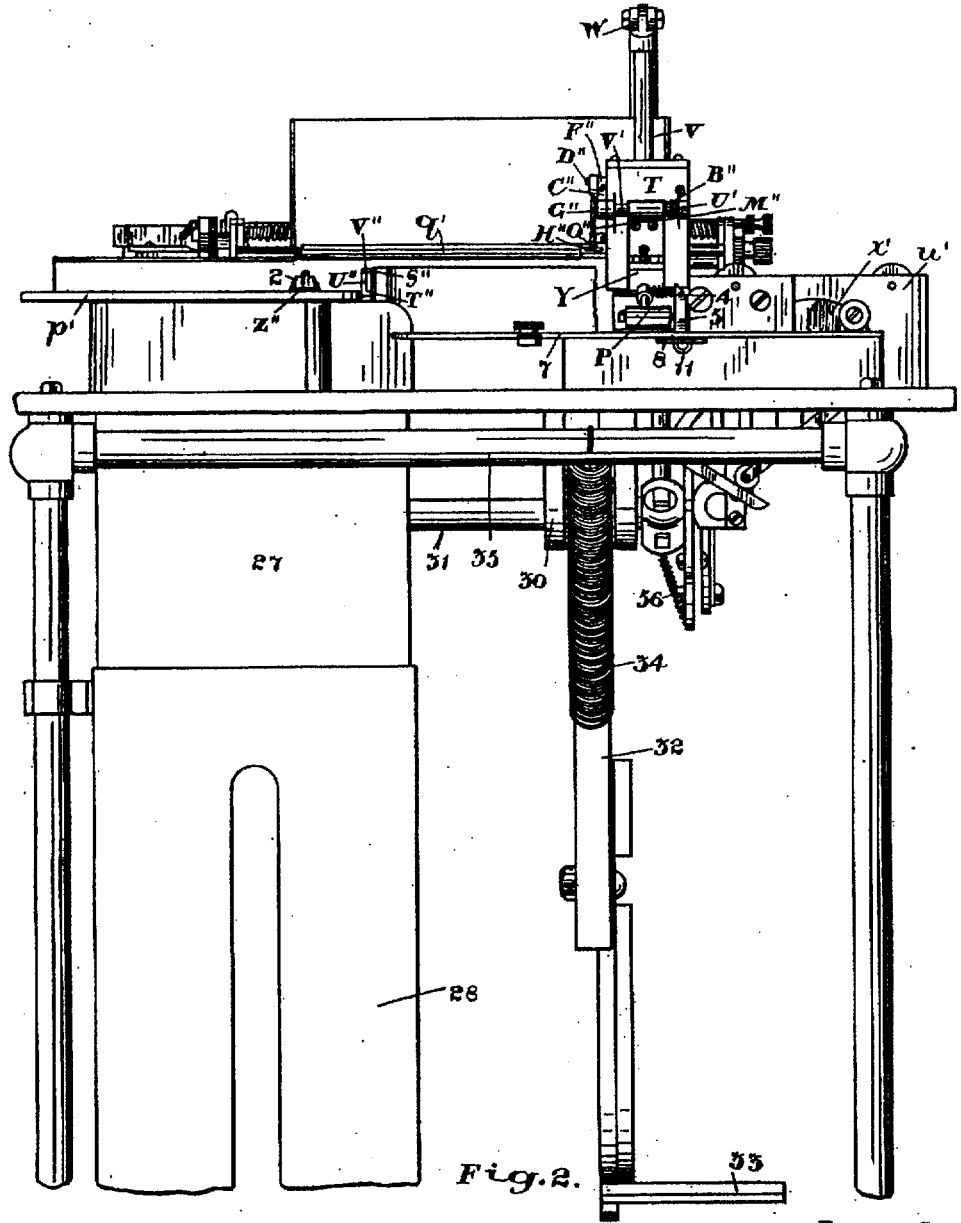
Figure 3:
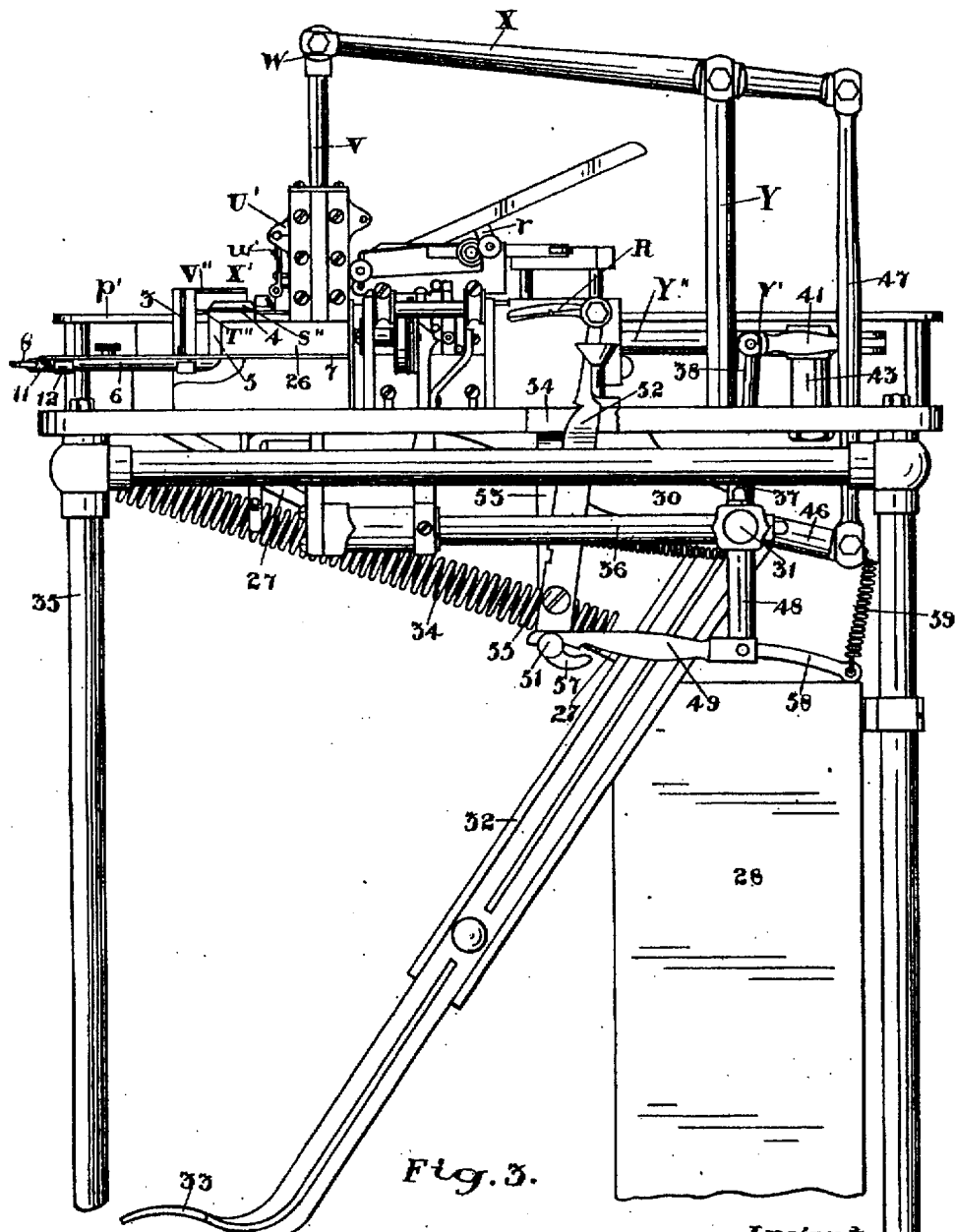
Figure 4:
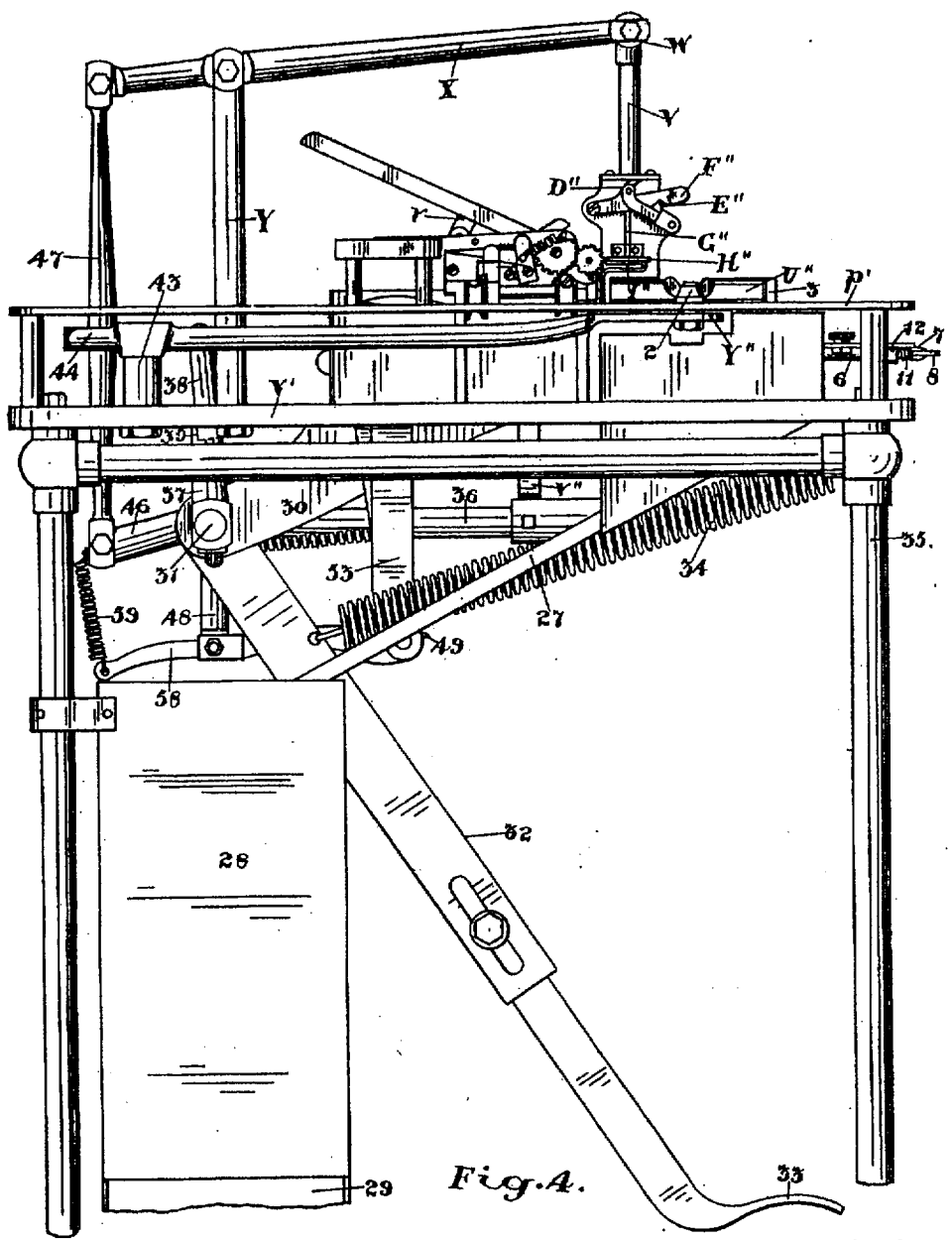
Figure 7:
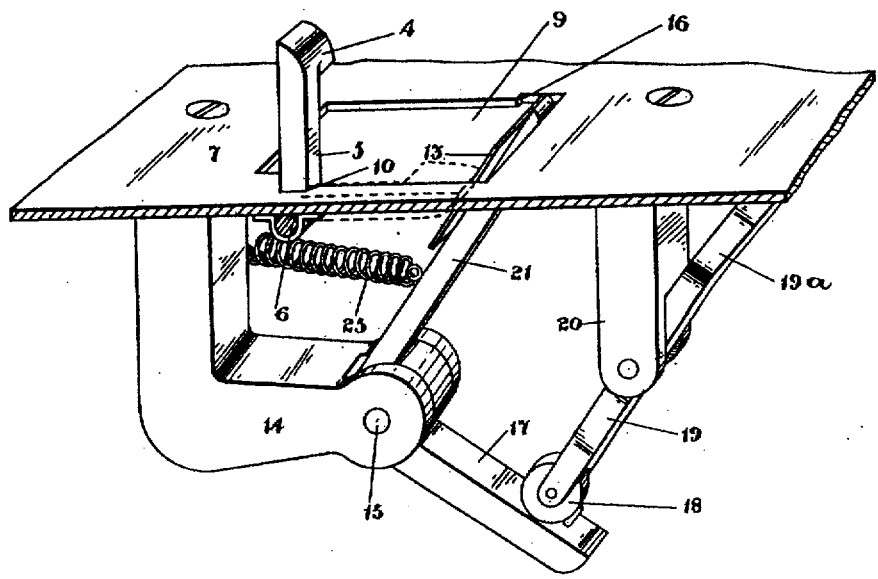
Figure 8:
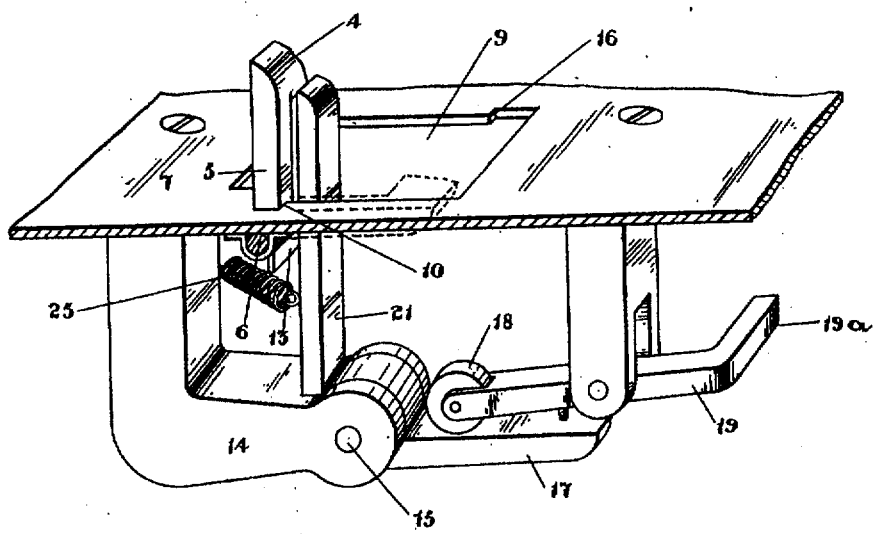
Figure 9:
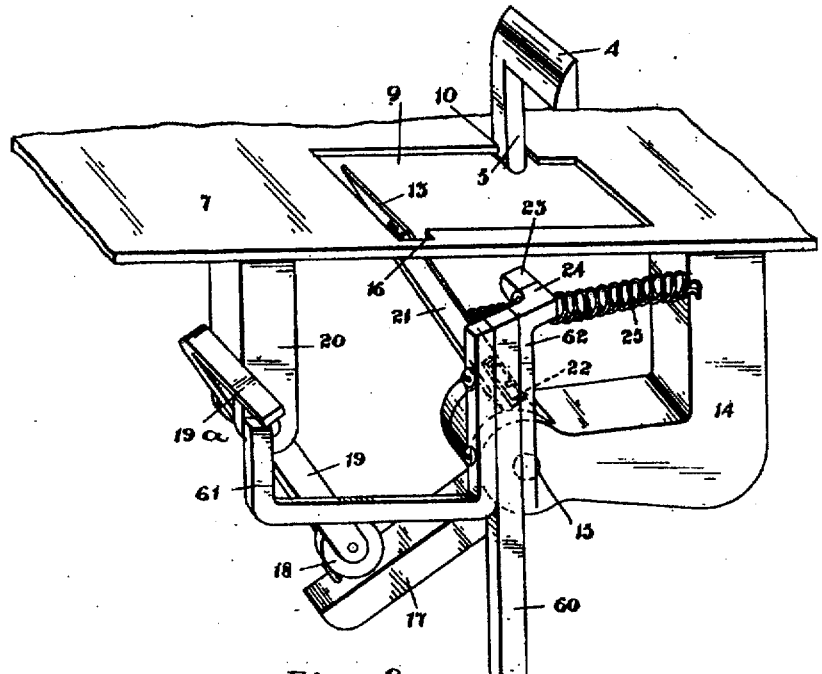
Figure 26:
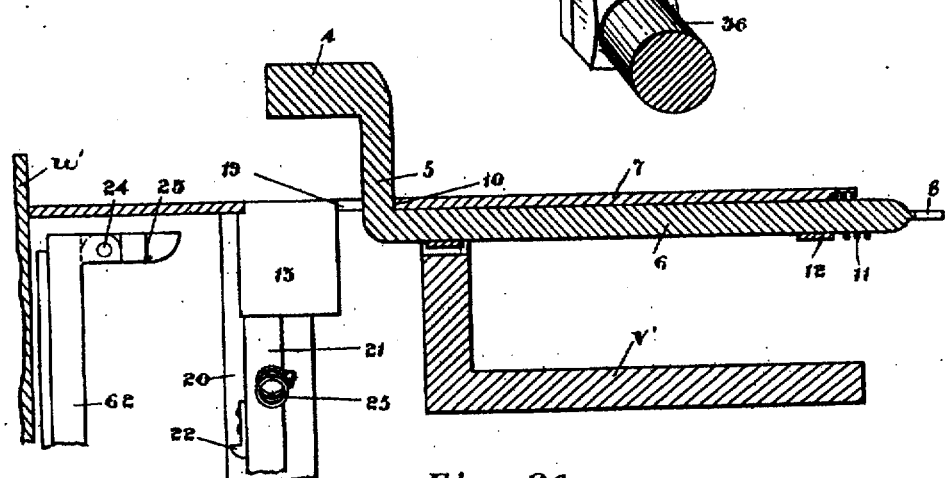
Figure 27:
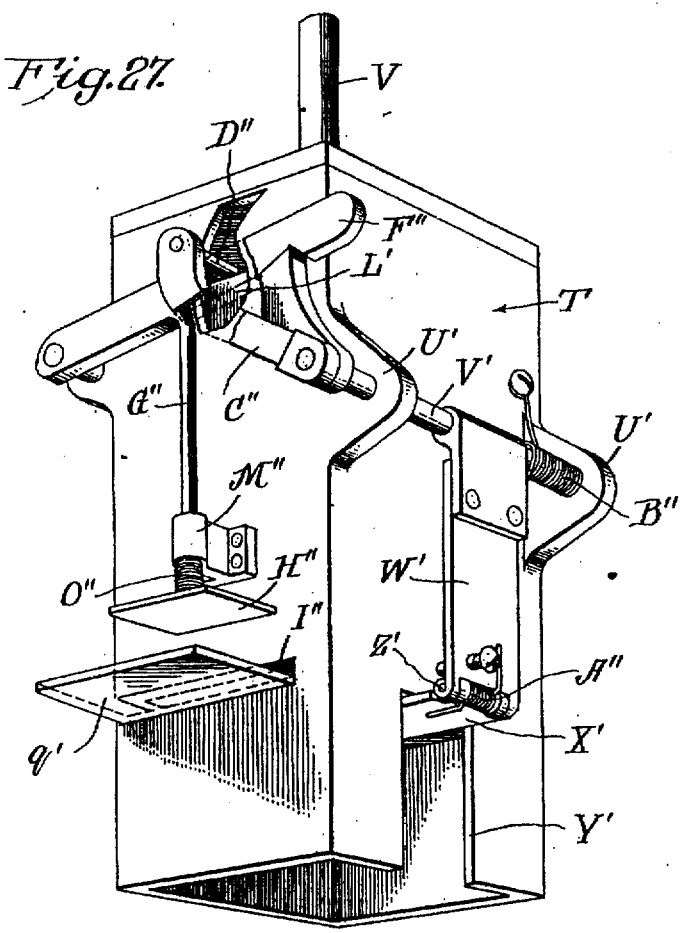
Figure 28:
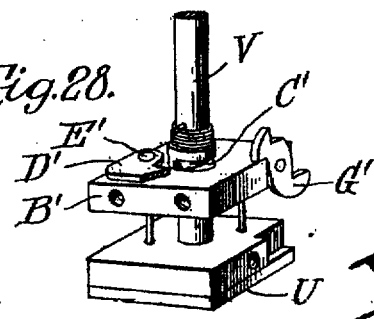

For an understanding of the invention, reference is to be had to the following description, and to the accompanying drawings in which, Figure 1 is a plan view of the machine with part of the bed plate broken away, showing the relative position of the various parts. Fig. 2 is a front elevation of the machine, showing the normal position of the parts. Fig. 3, is a side elevation, showing the parts in same position as Fig. 2, this view being from the right of the machine. Fig. 4 is a side elevation showing the parts in the same position as in Figs. 2 and 3, this view being from the left of the machine. Fig. 5 is a side elevation of part of the construction shown in Fig. 3, with the operable mechanisms moving to perform their functions. Fig. 6 is a similar view to Fig. 5, with the movements of the operable mechanisms completed to the affixing of the stamp. Figs. 7 and 8 are two perspective views of the envelop ejecting mechanism, showing two positions of the envelop ejector. Fig. 9 is a perspective view of the envelop ejecting mechanism, looking at it from the opposite side to Figs. 7 and 8, showing the tripping mechanism for the ejector. Fig. 10 is a plan view of the top of the stamp carriage. Fig. 11 is a plan view of the bottom of the stamp carriage. Fig. 12 is a front elevation of the stamp carriage showing the feed rolls in their closed position. Fig. 13 is a similar view to Fig. 12, showing the feed rolls open. Fig. 14, is an elevation of the left side of the stamp carriage. Fig. 14ᵃ is a similar view to Fig. 14 with part of the operating mechanism shown in Fig. 14, removed. Fig. 15, is a similar view to Fig. 14, or the right side of the stamp carriage. Fig. 15ᵃ is a detail view of the detent for the stamp carriage. Fig. 16 is a perspective view of the moistener reservoir. Fig. 17 is a perspective view of the moistener and cross head therefor. Fig. 18 is a perspective view of the stamp affixing plunger and part of the severing means, showing them in their inoperative positions. Fig. 19 is a similar view to Fig. 18, showing the relative position of the stamp severing means and the stamp affixing plunger, while the latter is affixing the stamp. Fig. 20, is a perspective view of one of the sides of the stamp severing means. Fig. 21, is a perspective view of one of the plunger sides. Fig. 22, is a perspective view of one of the other sides of the stamp severing means. Fig. 23 is a perspective view of part of the plunger rod. Fig. 24 is a perspective view of the stamp tray. Fig. 25 is a sectional view of the winding drum. Fig. 26 is a section through the envelop supporting table. Fig. 27 is a perspective view of the plunger mechanism and associated parts, and Fig. 28 is a detail of the stamp severing plunger.

Like characters of reference refer to like parts throughout the specification and drawing.

*Stamp carriage.* (See Figs. 10, 11, 12, 13, 14 and 15.)—The stamps are intermittently presented to the stamp affixing mechanism by the stamp carriage. The stamp carriage has two revoluble feed rolls $a$ and $b$, to frictionally engage the stamps and feed them from the stamp tray $c$ toward the stamp guide $q'$. The feed roll $a$, is journaled in the carriage sides $d$ $d^4$, below the plane of the place where the stamps are presented to the stamp affixing mechanism, and the feed roll $b$ is arranged parallel with, and in the same vertical plane as the feed roll $a$. To provide for the separation of the feed rolls $a$ and $b$, the latter is journaled in rocker arms $e$ and $f$, mounted on and movable with the rock shaft $g$. The rock shaft $g$, is journaled in the carriage sides $d$, $d^4$ in the rear of the feed rolls $a$ and $b$, and coiled on the rock shaft $g$ are tension springs $h$. The tension springs $h$ are held by pins $i$, inserted through the rock shaft $g$, and by pins $j$, inserted into the carriage sides $d$ $d^4$ adjacent to the rock shaft, so that they can apply the requisite tension to the rock shaft and position it to hold the movable feed roll $b$, normally in contact with the stationary feed roll $a$, and return the rock shaft, rocker arms and movable feed roll $b$ from the position shown in Fig. 11, to that shown in Fig. 12, as hereinafter stated. The terms "movable" and "stationary," are used in the sense, that the latter is revoluble continuously in a fixed position, and the former is movable into and out of contact with the latter feed roll. Fulcrumed to one of the carriage sides $d$, below the rocker arm $f$, is a lever $k$, having a projection $l$, which constantly engages the lower edge of the rocker arm $f$. As shown in Fig. 14, the lever $k$, normally lies in a forward oblique position from the center of its fulcrum, and when it is in the position shown in Fig. 14, the feed roll $b$, is in contact with the feed roll $a$, as shown in Fig. 12. When the lever $k$ is moved in the direction indicated by arrow in Fig. 14 from the position shown in that figure, the projection $l$ engages with the rocker arm $f$, raises the rocker arm and causes it to rock the shaft $g$ and impart a corresponding movement to the rocker arm $e$, at the other side of the stamp carriage and move the feed roll $b$ from the position shown in Fig. 12, to that shown in Fig. 13, so that the initial row of stamps can be freely entered between the feed rolls. When the initial row of stamps is entered, the lever can be lowered into the position shown in Fig. 14, so that the tension springs $h$ can return the rock shaft and rocker arms to their normal position and bring the movable feed roll $b$, back into the position shown in Fig. 12. The carriage sides $d$ $d^4$, are connected together by rigid bars $o$, bolted or otherwise fastened to the inner faces of the said carriage sides, to maintain them in a fixed position with relation to each other.

Extending inwardly from the top of the carriage sides $d$ $d^4$, in rear of the feed rolls $a$ and $b$, are vertical slots $p$, to receive the supporting rod $q$, for the stamp tray $c$. The supporting rod $q$, is fixed or rigidly secured to lugs $r$, extending downwardly from the sides of the stamp tray $c$, and the ends of the supporting rod $q$, are screw threaded to receive the adjusting nuts $s$, so that the stamp tray $c$ can be moved laterally, and locked in its adjusted position to compensate for any variation in the width of the salvage of the sheets of stamps, so that the rows of perforations will be alined with the severing edges of the stamp severing means as hereinafter described. The supporting rod $q$ is provided with a lock nut $u$, to engage one of the adjusting nuts $s$, and prevent any variation of the adjusting nuts from their set position. One end of the movable feed roll $b$ is provided on the outer face of the adjacent carriage side $d^4$, with a milled thumb nut $v$, for its manual operation, and is also provided with a milled collar $w$, between the adjacent carriage side $d^4$ and the thumb nut $v$, to be engaged by a retardation spring $x$, which frictionally resists its revolution during the severance of the presented stamp. At the opposite end of the movable feed roll to the thumb nut $v$, is a pinion $y$, which meshes with a spur wheel $z$, revolubly mounted on a stud $a'$, projecting from the carriage side $d$, at the same end of the carriage as the pinion $y$, and forming part of the side face of the spur wheel $z$, is a ratchet wheel $b'$ engaged by the ratchet teeth $c'$ of the slidable lever $d'$. The slidable lever $d'$ is provided with a guide pin $e'$ movable in the guide way $f'$ formed in the rigid arm $g'$ which is supported on two blocks $h'$ and $i'$ secured to the carriage side $d$. The lever $d'$ engages the outer side of the arm $g'$, and the guide pin $e'$ is provided with a washer $j'$ which overlaps the guide way $f'$ and engages the inner side of the arm $g'$, to prevent the lateral movement of the guide pin and slidable lever $d'$. By this means the lever is permitted to move forwardly in the guide way $f'$ when actuating the ratchet wheel $b'$, and rearwardly when returning to its inactive position and can rock on the guide pin $e'$ to enable its ratchet teeth $c'$ to engage with the teeth of the ratchet wheel $b'$ during its forward movement and clear the ratchet teeth as it returns. To return the slidable lever, a spring $k'$ is connected to the slidable lever, and to the block $i'$. The block $i'$ has a roller $l'$ which engages the outer side of the lever $d'$ and assists the washer $j'$ in preventing the lateral movement of the slidable lever $d'$. At the rear end of the slidable lever $d'$ is an idler $m'$ to engage with the stationary cam $o'$. The stationary cam $o'$ is rigidly fastened to the bed plate $p'$ and when the carriage moves into the position shown in Fig. 1, the idler $m'$ engages with it. The cam $o'$ as shown in Fig. 1, of the drawings, consists of a straight bar arranged obliquely to the length of the machine and as the idler $m'$ travels along it, the slidable lever $d'$ is forced toward the front of the machine to rotate the ratchet wheel $b'$ and cause a corresponding movement of the spur wheel $z$, and pinion $y$, to revolve the feed roll $b$, and feed the succeeding stamps to the stamp guide $q'$. The bed plate $p'$ is provided with an adjustable carriage stop $r'$ to limit the return movement of the carriage and prevent the idler $m'$ moving beyond the front end of the stationary cam $o'$. The bars $o$, of the stamp carriage are preferably of an annular shape in cross section and travel upon grooved wheels $s'$ mounted on the cross bars $t'$ secured at the top of a carriage supporting frame $u'$ fastened to the machine bed $v'$.

The carriage supporting frame, as shown in Figs. 1 to 6 inclusive, extends lengthwise, of the direction, of the movement of the carriage and parallel therewith, and consists of two separated sides rigidly connected together at the top of the cross bars $t'$, arranged transversely to the length of the carriage supporting frame. The grooved wheels $s'$ are revolubly mounted on the cross bars $t'$ and are arranged in two parallel rows beneath the carriage bars $o$. Projecting from the inner face of one of the sides of the carriage supporting frame $u'$ is a stud $w'$ on which is revolubly mounted a winding drum $x'$, and connected to the winding drum $x'$ is one end of a flexible chain $y'$, the opposite end of the chain being connected to a hook $z'$ at the remote end of the carriage. Connected to the winding drum $x'$, and to the stud $w'$ is a coiled spring $a''$ by which the winding drum $x'$ is turned to wind the chain $y'$ thereon.

An intermittent movement of the carriage is necessary to permit of the operation of severing and affixing the stamps, and this intermittent movement is effected by a controlling mechanism consisting of two rack bars $b''$ and $c''$ associated with a reciprocatory detent. The rack bar $b''$ is rigidly fixed to the carriage sides $d$ and $d^4$ so that it will only move in unison with the carriage, and is provided with guide pins $d''$. The rack bar $c''$ is formed with two longitudinally arranged slots $e''$ to receive the guide pins $d''$ so that the guide pins $d''$ can support it while in repose and during its individual movement and during the movement of the rack bar $b''$ with the carriage. To prevent the separation of the rack bars $b''$ and $c''$ the former is provided with a U-shaped clip $f''$ one side of which engages the remote side of the rack bar $c''$ to hold it in contact with the rack bar $b''$. One of the guide pins $d''$ projects beyond the rack bar $c''$ and connected to it, and to a pin $g''$ projecting from the rack bar $c''$, is a coiled spring $h''$ to impel the rack bar $c''$ in the direction of the movement of the carriage, when the former has been released by the change of position of the detent dog $i''$, the movement of the rack bar $c''$, being limited only by the ends of the slots $e''$ engaging with the guide pins $d''$. To provide for the requisite movement of the rack bar $c''$, the carriage side $d^4$, is formed with an aperture $j''$ through which the rack bar moves when actuated by the spring $h''$. The detent dog $i''$ is slidably and pivotally mounted on a pin $k''$, secured to a cross plate $l''$ forming part of the carriage supporting frame, and the detent dog $i''$ is provided with an arm $m''$, having at or near its end a weight $o''$, which normally maintains the dog in an upright position to engage with the teeth of the rack bars $b''$ and $c''$. Slidably mounted on the pin $k''$ is a yoke having two arms $p''$ and $q''$, between which is located the detent dog $i''$. Projecting from the arms $p''$ and $q''$ are positioning pins $r''$ and $s''$ respectively to be engaged by the forks $t''$ and $u''$ of the bifurcated arm $v''$ as it reciprocates under the influence of the actuating mechanism. When the parts are in their normal position, i. e. prior to the initial movement of the stamp carriage, the detent dog $i''$ is in engagement with the first tooth of the rack bar $c''$, and the guide pins $d''$ then engage the forward end of the slots $e''$ to prevent the forward movement of the carriage. During the actuation of the operating mechanism, the fork $t''$ of the bifurcated arm $v''$ moves into engagement with the positioning pin $r''$ and causes it to move the yoke toward the front of the machine, and carry the detent dog $i''$ in the same direction, so that the detent dog $i''$ will be disengaged from the engaging tooth of the rack bar $c''$, and moved into engagement with the corresponding detent tooth of the rack bar $b''$ and hold the carriage stationary while the stamp is being severed and affixed.

When the parts of the actuating mechanism are completing their motion and returning to their normal position, the fork $u''$ of the bifurcated arm engages with the positioning pin $s''$ and moves the positioning pin and the arms of the yoke toward the rear of the machine, the yoke carrying with it the detent dog $i''$, so that the detent dog $i''$ will be moved from engagement with the tooth of the rack bar $b''$ and moved into engagement with the succeeding tooth of the rack bar $c''$ which came into position under the influence of the coiled spring $h''$ during the forward movement of the detent dog $i''$. When the detent dog $i''$ is released from the engaging tooth of the rack bar $b''$ the carriage moves forward until the guide pins $d''$ come into engagement with the forward ends of the guide slots $e''$ and arrest the further movement of the carriage in the forward direction, the stamp carriage being then held by the engagement of the detent dog and the engaging tooth of the rack bar $c''$. The pitch of the teeth of both rack bars coincide and correspond with the distance between the rows of perforations between the stamps so that each movement of the carriage will present a succeeding row of perforations to the stamp severing mechanism. When the carriage has moved the distance of one tooth its motion is arrested as above stated, and the actuating mechanism is positioned ready for the succeeding operation of the machine. Concisely stated the detent dog $i''$ is normally in engagement with one of the teeth of the rack bar $c''$ and is moved from its engagement with that tooth into engagement with the corresponding tooth of the rack bar $b''$ by the initial movement of the bifurcated arm $v''$ and is moved from engagement with the tooth of the rack bar b″, into engagement with the succeeding tooth of the rack bar c″ during the return movement of the bifurcated arm. Connected to the top of the sides of the moistener reservoir w″ is a bracket x″ provided with an idler y″ which engages the top of the rack bar b″, and prevents the vertical displacement of the stamp carriage from the grooved wheels, and secured to the rack bar b″ is a stop z″ which engages with the idler y″ and arrests the carriage when its movement is completed.

*Envelop-moistener.* (See Figs. 2, 3, 5, 6, 16 and 17.)—The moistening means are located vertically in rear of and below the place where the stamps are presented to the stamp severing and affixing mechanism, and may be described as consisting of a moistener reservoir, a moistener roller, and an operating mechanism. The moistener reservoir w″ is divided into two compartments B and D by a partition A. In the front compartment B, is a sponge C, or other absorbent device, and the rear compartment D is employed to receive the water to moisten the sponge C. The top of the compartment B is cut away, and covered with a felt pad E having a clamping nut F, movable in a slot G, extending lengthwise of the reservoir. The clamping nut F when released permits of the pad E being opened to provide a means of access to the interior of the compartment B, or tightened to securely hold the pad positioned, to close the opening into the compartment and form a substantially smooth surface for the moistener roller H as shown in Figs. 16 and 17. Entering the compartment D is an inlet pipe I, provided with a funnel J, through which the water is introduced. The water passes from the compartment D into the compartment B, through an opening K, preferably formed between the lower edge of the partition A, and the bottom of the reservoir, as shown in Fig. 16. When the water enters the compartment B, it is absorbed by the sponge or other absorbent material C, and saturates the pad E, on which the moistener roller H moves. The axle L of the moistener roller H is journaled in the roller frame M, and the roller frame M is rockably mounted on the moistener rod O. By thus connecting the moistener roller H, to the moistening rod O, the roller can adapt itself to any unevenness in the surface over which it is moving. Connected to the roller frame M, and extending forwardly over the moistener roller H, is a shield P to prevent the water splashing against the other parts of the machine during the movement of the roller. The moistener rod O is articulatingly connected to a cross head Q, which is reciprocatingly movable in slideways R, forming part of the moistener frame. Coiled on the cross head Q is one end of a spring S the other end of which spring bears on the moistener rod O, to hold the moistener roller in contact with the surface over which it is moving.

By articulatingly connecting the moistener rod O to the cross head the moistener roller can move from one horizontal plane to another to adapt itself to any variation in elevation of the surface over which it is moving and by its articulation it can readily adapt itself to any variation of that surface from a horizontal plane. The moistener roller H is reciprocated by the actuating mechanism hereinafter described. During its initial movement the moistener roller moves from the pad E, through an aperture in the carriage supporting frame w′ to the envelop positioned immediately below the stamp severing and affixing mechanism, and when it has completed its forward movement is released by the actuating mechanism and instantaneously returned to its initial position under the influence of a return spring hereinafter described, so that it will be clear of the path of the stamp severing and affixing mechanism when the latter approaches the envelop with the stamp to be affixed.

*Stamp severing and affixing mechanism.* (See Figs. 2, 3, 4, 5, 6, 18, 19, 20, 21, 22 and 23.)—The stamp severing and affixing mechanism is provided with a plunger guide way T, located in front of the stamp carriage and vertically above the path of the moistener roller. Vertically movable in the plunger guide way T, is the stamp severing and affixing plunger U, provided with a plunger rod V, connected by a swinging joint W to the rocker arm X fulcrumed between its ends to a standard Y which projects from the machine bed a′. The plunger U consists of a bottom member T fixed to the lower end of the plunger rod V and a top member B′ through which the plunger V is slidable as hereinafter stated. The plunger rod V is formed with a circumferential channel C′ above the top member B′ to receive the pivoted latch D′ when the top and bottom members are together as shown in Fig. 18. The latch D′ is pivoted to the top of the top member B′ and as shown in Figs. 18 and 19 is of a substantial U-shape, with one leg pivoted to the top member B′ by the pivot screw E′ and the other leg formed with a lug F′ constantly engaged by the top arm of the trip dog G′. The bottom arm of the trip dog is engaged by the wall of the guideway T and is moved by the latter from the position shown in Fig. 19, to that shown in Fig. 18, so that it will press the pivoted latch into the channel C′ to lock the top and bottom members together and cause them to move in unison. The top member, B′, is provided with a collar H′ which constantly engages the pivoted latch D′ and guides it as it enters or recedes from the channel C′. Coiled on the plunger rod V is a spring K'. The spring K' engages the collar H' and a stop J' secured to the plunger rod, to press the top member of the plunger toward the bottom member. Secured to the two adjacent sides of the top member B' are two stamp severing plates L' formed with serrated cutting edges M' which project slightly below the bottom surface of the bottom member to engage with the rows of perforations of the presented stamp, and sever the latter from the remaining stamps of the sheet during the descent of the plunger.

Secured to the top member B' is a side plate O' the bottom edge of which projects below the cutting edges of the stamp severing plates to come into contact with the envelop and arrest the progress of the top member and the stamp severing plate. The side plate O' is provided with a spring P' which engages the free arm of the pivoted latch D' and presses the latch into the position shown in Fig. 19 when the bottom arm of the trip dog has passed beyond the plunger guideway. The side plate O' is provided with an aperture Q' through which the free arm of the trip dog G' projects to enable it to be engaged by the adjacent wall of the plunger guide way T. When the trip dog is engaged by the wall of the plunger guideway T, it presses the trip dog into the position shown in Fig. 18, and causes it to hold the latch in the channel of the plunger rod to lock the top and bottom members of the plunger together. When the plunger has moved in the plunger guide way to carry the bottom arm of the trip dog past the lower edge of the plunger guideway the pressure of the spring P' on the free leg of the latch moves the latch and trip dog from the position shown in Fig. 18, to that shown in Fig. 19, and causes the separation of the top and bottom members of the plunger so that the bottom member can continue its movement independently of the top member.

When the actuating mechanism is set in operation the detent dog for the carriage is released from engagement with the rack bar $a''$ and brought into engagement with the corresponding detent tooth of the rack bar $b''$ to hold the carriage in a stationary position. The moistening mechanism and the stamp affixing and severing mechanism are simultaneously operated to respectively move the moistener roller across the surface of the positioned envelop and bring the stamp severing mechanism into engagement with the presented stamp, the parts being timed so that while the roller is moistening the stamp surface the stamp severing plates are cutting the presented stamp from the remaining stamps of the sheet. The moistener roller is released by the actuating mechanism when it has moved completely across the stamp surface of the envelop, and is returned within the moistener by a spring of sufficient strength to cause its instantaneous return movement, the plunger continuing its movement at its normal rate of speed. When the stamp is severed from the sheet it is engaged by two stamp holding pins R' connected to the top member B' and projecting through, and below the bottom surface of, the bottom member Z. While the wall of the plunger guideway is engaging the lower arm of the trip dog the latter holds the latch in the channel of the plunger rod as shown in Fig. 18, so that the top and bottom members of the plunger will move unitedly, and when the trip dog has passed the lower edge of the plunger guideway the spring P' moves the latch and the dog into the position shown in Fig. 19 to displace the latch from the channel. The spring K' then causes the united movement of the top and bottom members of the plunger until the bottom edge of the side plate O' comes into contact with the envelop, when the further movement of the stamp severing plates and top member B' is arrested and the continued movement of the bottom member is maintained by the action of the plunger rod and rocker arm, to remove the stamp from the stamp holding pins and press it on the surface moistened by the moistener roller. The yielding nature of the envelop, and the irregularity of the moistened surface is compensated for by the connection between the bottom member and the plunger rod which permits the bottom surface of the bottom member to adapt itself to the surface of the envelop. To protect the stamp against injury by the plunger, the bottom surface of the bottom member is provided with a yielding cushion T', but this cushion need not necessarily be used.

Projecting from the front side of the plunger guideway T, are two lugs U' in which is mounted a rock shaft V', and loosely mounted on the rock shaft V' is the stamp holder which consists of a vertical plate W' and a horizontal plate X' connected by a hinge pin Z' to the lower end of the vertical plate normally projecting through a slot Y' in the front side of the plunger guideway and extending beneath the presented stamp. Coiled on the hinge pin Z' is a tension spring A'' which normally holds the horizontal plate X' at a substantially right angle to the vertical plate W', and coiled on the rock shaft V' is a tension spring B'' which restores the stamp holder to its normal position as the stamp severing and affixing mechanism returns to its inoperative position. During the descent of the plunger the stamp holder by the pressure of the plunger thereon as the latter descends is moved from the position shown in Fig. 3, to that shown in Fig. 6, and as the parts return from the position shown in Fig.

6 to that shown in Fig. 3, the tension spring B″ returns the stamp holder with them. The rock shaft V′ is provided with an arm C″ extending along the adjacent side of the plunger guideway, and the arm C″ has a pin D″ extending within the plunger guideway which engages the top edge of one of the stamp severing plates L′. As the plunger returns to the position shown in Fig. 3, it lifts the pin D″ and rocks the arm C″ and rock shaft V′. The arm C″ is formed with a projection E″ which may be termed a cam, and this cam engages an arm F″ pivoted to the plunger guideway.

Attached to the arm F″, is a connecting rod G″ provided at its lower end with a presser foot H″ opposed to the top surface of the stamp guide q′. The connecting rod G″ slides in a guide way M″ connected to the plunger guideway between the presser foot, and the arm F″, and coiled on the connecting rod G″ between the presser foot and guideway M″, is a spring O″ to force the presser foot in the direction of the stamp guide. The stamp guide q′ is located along the front of the carriage supporting frame a′ and extends to the plunger guideway T. Formed in the plunger guideway T is a slot I″ alined with the stamp guide q′, the plane of the bottom surface of the slot I″ being alined with the top surface of the horizontal plate X′, and immediately below the bottom surface of the bottom member of the plunger, so that the stamps will be presented between these two parts.

When the stamp severing plate moves out of engagement with the pin D″, as the stamp affixing plunger descends the spring O″ forces the presser foot into contact with the stamp guide, to securely clamp the stamps on the stamp guide q′ prior to the engagement of the stamp severing blades with the presented stamp, to enable the stamp severing blades to cut the rows of perforations between the presented stamp and the adjoining ones, without drawing them into the plunger guideway T.

*Envelop-feeding mechanisms.* (See Figs. 1, 2, 3, 4, 5 and 6.)—In the bed plate p′ is a slot P″. At the sides of the slot P″ are ledges q″, at a lower plane than the top of the bed plate p′. The ledges q″ form a slideway for the slotted arm R″ of the envelop feeder S″. The slotted arm R″ moves lengthwise on the slideway Q″ and the envelop feeder S″ is arranged transversely to the length of the arm R″. The envelop feeder S″ consists of a horizontal plate T″ which slides on the top of the bed plate p′ and a vertical plate U″ at the back of the horizontal plate T″ having at its upper end a flange V″ which overhangs the plate T″. Through the slotted arm R″ extends the stud X″ which pivotally connects the slotted arm to the oscillating arm Y″ located below the bed plate p′. Encircling the stud X″ is a washer Z″ which engages the top surface of the plate T″ and adjustable on the stud X″ is a set nut 2. By this construction it is possible to adjust the feeder to envelops of any ordinary length. During the oscillation of the arm Y″ the envelop feeder is respectively moved from the stamp severing and affixing mechanism to receive the envelop and is then moved toward the stamp severing and affixing mechanism to deliver the envelop thereto. Secured to the bed plate p′ contiguous to the slot P″ is an envelop gage 3, the front face of which is alined with the front face of the carriage supporting frame.

When the envelop feeder S″ is in its initial position the envelops are placed on the bed plate p′ with one edge in contact with the gage 3. Located in front of the plunger guideway T is an adjustable envelop stop 4, to arrest the movement of the envelop when delivered by the envelop feeder and hold it positioned to receive the presented stamp. The envelop stop 4, consists of an L-shaped arm 5 connected to or integrally formed with a rock shaft 6 journaled in bearings below the envelop supporting table 7, and is provided with a thumb grip 8, at its outer end by which it can be rocked and positioned. The L-shaped arm of the envelop stop 4, projects through an aperture 9, in the envelop supporting table 7, which is of sufficient size to permit of the operation of the envelop stop and the envelop ejector, as hereinafter described. In the aperture 9, is a recess 10, alined with, and arranged to receive and hold the upright part of the L-shaped arm when in its vertical position. When in an upright position the upright part of the L-shaped arm is retained in the recess 10 by the pressure of the spring 11, coiled on the rock shaft 6, between the thumb grip 8, and outer bearing 12, for the rock shaft. By pressing the rock shaft 6, inwardly the L-shaped arm can be displaced from the recess 10, and lowered below the plane of the envelop supporting table 7, as shown in dotted lines in Figs. 7 and 8. When the L-shaped arm 5, is lowered into the position shown in dotted line in Figs. 7 and 8, the spring 11 draws it partly under the front side of the aperture 9, to engage with and enable the envelop supporting table to hold it in its lowered position. By lowering the L-shaped arm in this way, envelops of large sizes can be positioned below the stamp affixing plunger to receive the stamps to be affixed thereto.

*Envelop ejecting mechanism.*—The envelop ejector 13 operating through the aperture 9 is of a substantially bell crank shape, and is fulcrumed at the junction of its arms to a bracket arm 14, suspended from the under side of the envelop supporting table 7. The ejector has a slight lateral movement on its fulcrum pin 15, so that it can enter in, or be displaced from, the recess 16, forming part of the aperture 9. During the initial movement of the operating mechanism, the ejector is in the position shown in Fig. 7, and at the commencement of the return movement of the operating mechanism it moves quickly from the position shown in Fig. 7, to that shown in Fig. 8, and then returns again to the position shown in Fig. 7, before the operating mechanism has completed its return movement. To effect this operation of the ejector, one of the ejector arms 17 is engaged by the idler 18, of the swinging lever 19, fulcrumed to the arm 20, attached to the under side of the envelop supporting table 7. The lever 19 swings freely on its fulcrum pin and remains inactive until the envelop ejector has completed its action of ejecting the envelop. On the ejector arm 21, is a cam 22, engaged by a trip dog 23, pivoted to an arm 24 carried by the operating mechanism and is arranged so that during the downward movement of the arm 24 it will clear the cam 22. The ejector 13, during the initial movement of the operating mechanism is held in the position shown in Fig. 7, by its engagement with the sides of the recess 16. During the return movement of the operating mechanism, the trip dog 23 engages the cam 22, and causes a sufficient lateral movement of the envelop ejector 13, on the fulcrum pin 15, to enable the envelop ejector 13, to disengage itself from the holding parts of the recess, and move from the position shown in Fig. 7, to that shown in Fig. 8. Under the influence of the spring 25, which is connected to the ejector arm 21, and to the bracket arm 14, the ejector moves rapidly from the position shown in Fig. 7, to that shown in Fig. 8, the movement of the parts being so timed in their operation that the ejector is released from the holding parts of the recess when the stamp affixing plunger has commenced its return movement after the completion of its action to affix the stamp. Immediately on the completion of the ejecting movement of the envelop ejector 13, the swinging lever 19, is actuated to bring the idler 18, to bear on the ejector arm 17 and press it downwardly from the position shown in Fig. 8 to that shown in Fig. 7.

*Envelop delivery.*—At the delivery side of the envelop supporting table 7, is an opening 26 leading to the envelop chute 27, so that the envelops ejected by the envelop ejector 13 can pass to the envelop chute 27 and from the envelop chute 27 into the envelop receptacle 28, which for easy access to the envelops is provided with a door 29.

*Operating mechanism.* (See Figs. 2, 3, 4, 5, 6, 7 and 8.)—Journaled in bearings 30, suspended from the under side of the machine bed $v'$, is a rock shaft 31, to which is rigidly fixed the treadle lever 32. The treadle lever 32 is provided with a pedal 33, by which it is operated in one direction, and is connected by a spring 34 to the machine frame 35 by which it is operated in the other direction. When power is applied to the treadle lever 32, to move it from its initial position, it causes the rock shaft 31 to rock in one direction and when the power is removed from the treadle lever, the spring 34 causes it to move in the return direction and operate the rock shaft in the opposite direction to its first rocking movement.

Rigidly connected to the rock shaft 31, is a rocking lever 36, and rigidly connected to the lever 36 is the bifurcated arm $v''$, the forks $t''$ and $u''$ of which engage the positioning pins $r''$ and $s''$, and move the detent dog $i''$ alternately into engagement with the teeth of the rack bars $b''$ and $c''$. During the downward movement of the treadle lever, the rock shaft turns in its bearings and causes the downward movement of the rocking lever 36, to bring the fork $t''$ into engagement with the positioning pin $r''$ and move the detent dog $i''$ from engagement with the tooth of the rack bar $c''$ into engagement with the corresponding tooth of the rack bar $b''$ as above described to lock the stamp carriage, and prevent its movement during the operation of the other parts. The rock shaft 31 is provided with an arm 37, to which the vertical link 38 is connected by an ordinary swivel joint 39, and connected to the vertical link 38 by an ordinary swivel joint 40, is a horizontal link 41. The oscillating arm $Y''$ is fulcrumed to a stud 43 projecting from the machine bed $v'$, below the bed plate $p'$, and is formed beyond the fulcrum with a crank part 44, to which the horizontal link 41 is pivotally connected.

In the machine bed $v'$ is an elongated slot 45, through which the vertical link 38 operates, the elongation of the slot being sufficient to permit of the free movement of the vertical link during the rocking movement of the rock shaft. During the initial movement of the rock shaft 31 the vertical link 38 moves forwardly in and downwardly through the slot 45, and actuates through the agency of the horizontal link 41, the oscillating arm $Y''$ to move the latter to its initial position and carry the envelop feeder with it, so that the envelop feeder will be prepared to engage the envelop to be delivered to the stamp affixing mechanism. As the rock shaft returns to its initial position, the vertical link 38 moves upwardly through, and rearwardly in the slot 45, and again through the agency of the horizontal link 41 actuates the oscillating arm $Y'''$ to move from its initial position to its delivery position and cause the envelop feeder to present the envelop to the stamp affixing mechanism. Projecting from the rock shaft is an arm 46, to which is pivotally connected one end of the link 47. The opposite end of the link 47 is connected to the rocker arm X on the opposite side of its fulcrum connection with the standard Y to its connection with the plunger rod V. The arm 46 is so arranged that during the initial movement of the rock shaft it will raise the link 47 and cause the rocker arm X, to move the plunger rod V and plunger U, downwardly toward the positioned envelop to enable the plunger to affix the stamps thereto. During the return movement of the rock shaft, the arm 46 moves downwardly and through the agency of the link 47 raises the plunger U and plunger rod V in the plunger guideway and restores them to their initial position for the next operation of the stamp affixing mechanism.

Connected to the rock shaft 31, is an arm 48, and pivotally connected to the arm 48 is a latch 49 having a latch tooth 50 to engage with the latch pin 51, projecting from the lever 52. The lever 52 is fulcrumed to a bracket 53 projecting from the underside of the machine bed $w'$. The lever 52 works through an aperture 54 in the machine bed, adjacent to the moistener reservoir and the upper end of the lever 52 is connected to the cross head Q. The lever 52 rocks in one direction on its fulcrum pin 55, under the influence of the latch 49, and in the opposite direction under the influence of a spring 56 connected to the arm 48 and to the lever. During the return movement of the rock shaft 31, the arm 48 swings rearwardly and causes the latch tooth 50 to engage with the latch pin 51 so that during the initial movement of the rock shaft the latch will draw the lower end of the lever 52 in the direction in which the latch is moving. This action of the latch moves the upper end of the lever 52 in a forward direction at the commencement of the initial movement of the rock shaft, and as the upper end of the lever 52, is connected to the cross head Q, it moves the cross head, moistener rod, and moistener roller H, toward the front of the machine, and causes the moistener roller to travel across, and moisten the place for the stamp on the positioned envelop. When the moistener roller has completed its forward travel, a trip 57 connected to the lever 52 engages the latch 49, and disengages the latch tooth 50, from the latch pin 51, the trip being shown in Fig. 5, as just coming into engagement with the latch. When the latch tooth is disengaged from the latch pin, the spring 56 restores the lever 52 to the position shown in Fig. 3, which is its initial position, and that of the parts connected to it. The action of the spring is practically instantaneous, so that the lever will quickly return and cause the return of the cross head, moistener rod, and moistener roller to the position shown in Fig. 3, where the moistener roller will be entirely clear of the path of the plunger as it descends, the descent of which is coincident with the commencement of the initial movement of the lever 52. The action of the lever 52, and spring 56 are so timed that the moistener roller will move from the moistener reservoir across the path of the plunger, and moisten the surface for the stamp on the positioned envelop, and then return to the moistener reservoir before the plunger has left the plunger guideway. The latch 49 is provided with a rearwardly projecting arm 58, to which is connected one end of a spring 59. The opposite end of the spring 59 is connected to the link 47. The purpose of the spring 59 is to cause the latch tooth 50 to engage with the latch pin 51, when the parts are in the position shown in Fig. 3. As shown in Figs. 3 and 6 the forward end of the latch constantly rests on the latch pin 51, to prevent the latch making a false movement when being positioned, and insure the latch tooth 50 engaging with the latch pin 51.

Secured to the rocking lever 36 is a bifurcated arm 60 having two forks 61 and 62. The fork 61 is alined with the cranked portion 19ª of the swinging lever 19, and engages therewith as the lever 36 moves upward. During the upward movement of the lever 36, the fork 61 engages with the swinging lever 19 and moves the swinging lever 19, from the position shown in Fig. 8, to that shown in Fig. 7, to bring the idler 18 into engagement with the ejector arm 17. The swinging lever 19, as the rocking lever 36 moves upward, causes the ejector arm 17 to move downwardly from the position shown in Fig. 8, to that shown in Fig. 7, to enable the ejector to enter the recess 16, the spring 25, as shown in Figs. 7 and 8 being obliquely arranged to the vertical plane of these parts to draw the ejector into that recess 16, and enable the holding parts of the recess 16 to hold it there, until the trip dog 23 engages with the cam 22, and displaces the ejector from the recess 16. The trip dog 23, is pivoted to the fork 62 of the bifurcated arm 60, to release the ejector from the recess 16, before the fork 62 comes into contact with the swinging lever so that the spring 25 can cause its instantaneous movement to the position shown in Fig. 8 to enable the swinging lever to return it immediately thereafter to the position shown in Fig. 7. These parts may be more specifically described as follows: During the downward movement of the treadle lever, the ejector is held in the recess 16, and remains in the recess until the plunger has released its pressure on the envelop. When the pressure of the plunger is released the trip dog 23 engages with the cam 22, and displaces the ejector from the holding part of the recess. The ejector then, as a result of the action of the spring 25, moves from the position shown in Fig. 7, to that shown in Fig. 8. When the ejector has moved to the position shown in Fig. 8, the fork 61 engages with the crank portion of the swinging lever 19ª, and actuates the swinging lever to restore the ejector from the position shown in Fig. 8, to that shown in Fig. 7, this movement being completed prior to the treadle and rocking lever completing their return movement, so that the ejector will be properly positioned for its next operation. On the initial movement of the next operation of the apparatus, the treadle lever, rocking lever, and bifurcated arm 60, move downwardly into the position shown in Fig. 6, the trip dog turning on its pivot to clear the cam 22 without displacing the ejector from the recess 16. The treadle lever, the rocking lever 36, and the bifurcated arm 60 complete their downward movement and partially return to their normal position and the trip dog then engages with the cam and displaces the ejector from the recess 16.

The ejector can be prevented from acting by moving the envelop stop into the position shown in Fig. 7, in which position the envelop stop engages the ejector and counteracts the force of the spring 25.

Having thus fully described my invention what I claim as new and desire to secure by Letters Patent is:

1. A stamp affixing machine comprising a stamp carriage, a stationary feed roll journaled therein, arms pivotally connected to the stamp carriage, a movable feed roll journaled in the arms and co-acting with the stationary feed roll, and a lever fulcrumed to the stamp carriage engaging one of the pivoted arms to separate the movable feed roll from the stationary feed roll.

2. A stamp affixing machine comprising a stamp carriage, a stationary feed roll journaled therein, arms pivotally connected to the stamp carriage, a movable feed roll journaled in said arms co-acting with the stationary feed roll, a lever engaging one of said arms to separate the movable feed roll from the stationary feed roll, and means for applying pressure to the movable feed roll.

3. A stamp affixing machine comprising a stamp carriage, feed rolls journaled therein, a pinion mounted on one of the feed rolls, a spur wheel meshing with the pinion a ratchet wheel for the spur wheel, a slidable lever provided with ratchet teeth engaging with the ratchet wheel, and means for actuating the lever during the movement of the stamp carriage.

4. A stamp affixing machine comprising a stamp carriage a stationary feed roll journaled therein, a rock shaft journaled in the stamp carriage, articulating arms actuated by the rock shaft, a feed roll revolubly mounted in the articulating arms co-acting with the stationary feed roll, means for yieldingly holding the last mentioned feed roll in contact with the stationary feed roll, a pinion mounted on the movable feed roll, a spur wheel meshing with the pinion, a ratchet wheel for the spur wheel, a slidable lever actuating the ratchet wheel, and means automatically actuating the lever during the movement of the stamp carriage.

5. A stamp affixing means comprising a stamp carriage, a stationary feed roll revolubly mounted therein, a spring tensioned rock shaft mounted in the stamp carriage, arms connected to the rock shaft to move therewith, a movable feed roll mounted in the arms, to engage with the stationary feed roll, and a lever fulcrumed to the stamp carriage to actuate the rock shaft.

6. A stamp affixing machine comprising a stamp carriage a stationary feed roll revolubly mounted therein, a spring tensioned rock shaft mounted in the stamp carriage, arms connected to the rock shaft to move therewith, a movable feed roll mounted in the arms to engage with the stationary feed roll, a lever fulcrumed to the stamp carriage to actuate the rock shaft, a pinion mounted on the movable feed roll, a spur wheel revolubly connected to the stamp carriage meshing with the pinion, a ratchet wheel for the spur wheel, a slidable lever engaging with the ratchet wheel, means for automatically actuating the lever during the operation of the stamp carriage, and a spring to restore the lever when released from the influence of the last mentioned means.

7. A stamp affixing machine comprising a movable stamp carriage, means for actuating the stamp carriage to automatically position the stamps, a detent means for the stamp carriage consisting of a detent rack fixed to the stamp carriage, a second detent rack slidably connected to the first mentioned detent rack, means for limiting the movement of the slidable detent rack, a reciprocating detent dog alternately movable into engagement with the teeth of the stationary and movable detent racks and operable means for actuating the detent dog consisting of a bifurcated lever, the forks of which alternately move the detent dog in opposite directions.

8. A stamp affixing machine comprising a movable stamp carriage, means for actuating the stamp carriage to automatically position the stamps, a detent means for the stamp carriage consisting of a detent rack fixed to the stamp carriage, a second detent rack slidably connected to the first mentioned detent rack, means for limiting the movement of the slidable detent rack, a reciprocating detent dog alternately movable into engagement with the teeth of the stationary and movable detent racks, operable means for actuating the detent dog, consisting of a bifurcated lever, the forks of which alternately move the detent dog in opposite directions, and means for actuating the bifurcated lever.

9. A stamp affixing machine comprising a movable stamp carriage, means for actuating the stamp carriage to automatically position the stamps, a detent means for the stamp carriage consisting of a detent rack fixed to the stamp carriage, a second detent rack slidably connected to the first mentioned detent rack, means for limiting the movement of the slidable detent rack, a reciprocating detent dog alternately movable into engagement with the teeth of the stationary and movable detent racks, operable means for actuating the detent dog consisting of a bifurcated lever, the forks of which alternately move the detent dog in opposite directions, means for actuating the bifurcated lever, an oscillating arm connected to the bifurcated lever, a rock shaft with which the oscillating arm is connected, and means for actuating the rock shaft.

10. A stamp affixing machine comprising a movable stamp carriage, means for actuating the stamp carriage to automatically position the stamps, a detent means for the stamp carriage consisting of a detent rack fixed to the stamp carriage, a second detent rack slidably connected to the first mentioned detent rack, means for limiting the movement of the slidable detent rack, a reciprocating detent dog alternately movable into engagement with the teeth of the stationary and movable detent racks, operable means for actuating the detent dog consisting of a bifurcated lever, the forks of which alternately move the detent dog in opposite directions, means for actuating the bifurcated lever, an oscillating arm connected to the bifurcated lever, a rock shaft with which the oscillating arm is connected, and a spring tensioned treadle lever connected to the rock shaft.

11. A stamp affixing machine comprising a stamp carriage a detent rack fixed to the stamp carriage, a second detent rack slidably connected to the first mentioned detent rack, means for limiting the movement of the second mentioned detent rack, a spring to cause the movement of the second mentioned detent rack independently of the first mentioned detent rack, a detent dog alternately engaging with the teeth of the fixed and movable detent racks, a slideway for the detent dog, lever engaging means on opposite sides of the detent dog slidable therewith, a bifurcated lever, the forks of which contact the lever engaging means, an oscillating arm connected with the lever, a rock shaft for the oscillating arm, and means for actuating the rock shaft.

12. A moistening means for a stamp affixing machine comprising a moistener having a slideway therein, a cross head movable in the slideway, a spring tensioned moistener carrying arm connected to the cross head, a moistener connected to the moistener carrying arm, and means for moving the cross head in one direction and then releasing it, and other means for returning it to the opposite direction.

13. A moistening means for a stamp affixing machine comprising a reservoir, a slideway for the reservoir, a cross head movable in the slideway, a moistener carrying arm articulatingly connected to the cross head, a tension spring engaging the moistener carrying arm, a moistener connected to the moistener carrying arm, a lever actuating the cross head, a latch pin carried by the lever, an operable latch engaging the latch pin to move the lever in one direction and release it on the completion of that movement, means for actuating the latch, and a spring to move the lever in the opposite direction.

14. A moistening means for a stamp affixing machine comprising a moistener reservoir, a slideway for the moistener reservoir, a cross head movable in the slideway, a moistener carrying arm connected to the cross head, a moistener connected to the moistener carrying arm, a lever actuating the cross head, a latch pin for the lever, a rock shaft, means for actuating the rock shaft, an arm for the rock shaft, a spring tensioned latch fulcrumed to the arm to engage with the latch pin to move the lever in one direction, means carried by the lever to engage the latch and release it, from the latch pin when that movement is completed, and a spring connected to the lever and to the arm to move the lever and the parts actuated thereby in the opposite direction when released by the latch.

15. A stamp affixing machine comprising a stamp affixing mechanism, a movable stamp carriage, a stamp supporting means to receive the stamps from the stamp carriage alined with the entrance of the stamp affixing mechanism, a stamp engaging clamp opposed to the stamp supporting means, means for moving the stamp engaging clamp into engagement with the stamps during the initial movement, and out of engagement with the stamps during the return movement of the stamp affixing mechanism.

16. A stamp affixing machine comprising a movable stamp carriage, a stamp affixing mechanism, a stamp supporting means to receive the stamps from the stamp carriage alined with the entrance of the stamp affixing mechanism, means for holding the stamps while the stamp affixing means are severing the positioned stamp, means for positioning the stamp holding means during the initial movement of the stamp affixing mechanism, and means to restore the stamp holding means to its initial position during the return movement of the stamp affixing means.

17. A stamp affixing machine comprising a stamp affixing mechanism, a stamp supporting means to receive the stamps from the movable stamp carriage and a clamping means for the stamps comprising a spring tensioned presser foot, a pivoted lever, a link connecting the presser foot with the lever, a rock shaft actuated by the stamp affixing means, a cam carried by the rock shaft, to engage the lever and move the presser foot from the stamp supporting means as the stamp affixing mechanism returns to its normal position.

18. A stamp affixing machine comprising a stamp affixing mechanism, a stamp supporting means, a pivoted lever, a spring tensioned presser foot connected with the pivoted lever and opposed to the stamp supporting means, a rock shaft, an arm actuated by the rock shaft constantly engaging the pivoted lever, and means actuated by the stamp affixing mechanism to actuate the rock shaft and arm.

19. A stamp affixing mechanism for a stamp affixing machine, comprising a plunger, a stamp severing means movable with the plunger and having its severing edge normally projecting beyond the stamp engaging face of the plunger, and a stop carried by the stamp severing means to arrest its movement and allow the plunger to move beyond its severing edge.

20. A stamp affixing mechanism for a stamp affixing machine comprising a stamp severing means, a plunger movable with the stamp severing means and independently thereof, the severing edge of the stamp severing means normally projecting beyond the stamp engaging face of the plunger, and means for arresting the movement of the stamp severing means and permitting the plunger to move beyond the stamp severing edge thereof.

21. A stamp affixing means for a stamp affixing machine comprising a plunger, a stamp severing means movable with the plunger, having its severing edge projecting beyond the stamp affixing face of the plunger, means for arresting the movement of the stamp severing means, and permitting the plunger to complete its movement and stamp holding pins projecting through the plunger during the united movement of the plunger and stamp severing means, and means to arrest the movement of the stamp holding pins co-incident with the arrest of the movement of the stamp severing means.

22. A stamp affixing means for a stamp affixing machine comprising a movable plunger, a stamp severing means movable with the plunger having its severing edge projecting beyond the stamp affixing face of the plunger, a stop for the stamp severing means projecting beyond the stamp severing edge, a head for the stamp severing means located above the plunger, stamp holding means connected with the head and movable through and normally projecting beyond the stamp affixing face of the plunger.

23. In a stamp affixing machine, a stamp affixing mechanism comprising a plunger having a stamp affixing face, a plunger rod, a stamp severing head movable on the plunger rod, stamp severing blades connected to the stamp severing head having their edges normally projecting beyond the stamp affixing face of the plunger, a stop carried by the stamp severing head and projecting beyond the severing edges of the stamp severing blades.

24. In a stamp affixing machine, a stamp affixing mechanism comprising a plunger having a stamp affixing face, a plunger rod, a stamp severing head movable on the plunger rod, stamp severing blades connected to the stamp severing head having their edges normally projecting beyond the stamp affixing face of the plunger, a stop carried by the stamp severing head projecting beyond the severing edges of the stamp severing blades, and stamp holding pins connected to the stamp severing head normally projecting beyond the stamp affixing plunger.

25. In a stamp affixing machine, a stamp affixing mechanism comprising a plunger having a stamp affixing face, a plunger rod, a stamp severing head movable on the plunger rod, stamp severing blades connected to the stamp severing head having their edges normally projecting beyond the stamp affixing face of the plunger, a stop carried by the stamp severing head projecting beyond the severing edges of the stamp severing blades, and means to temporarily lock the plunger and stamp severing head together.

26. In a stamp affixing machine, a stamp affixing mechanism comprising a plunger, having a stamp affixing face, a plunger rod, a stamp severing head movable on the plunger rod, stamp severing blades connected to the stamp severing head having their edges normally projecting beyond the stamp affixing face of the plunger, a stop carried by the stamp severing head projecting beyond the severing edges of the stamp severing blades, stamp holding pins connected to the stamp severing head normally projecting beyond the stamp affixing plunger, and means to temporarily lock the plunger and stamp severing head together.

27. In a stamp affixing machine, a stamp affixing mechanism comprising a plunger having a stamp affixing face, a plunger rod, a stamp severing head movable on the plunger rod, stamp severing blades connected to the stamp severing head having their edges normally projecting beyond the stamp affixing face of the plunger, a stop carried by the stamp severing head projecting beyond the severing edges of the stamp severing blades, means to temporarily lock the plunger and stamp severing heads together, said means consisting of a groove formed in the plunger rod, a latch pivoted to the stamp severing head, and a trip dog for the latch.

28. In a stamp affixing machine, a stamp affixing mechanism comprising a plunger having a stamp affixing face, a plunger rod, a stamp severing head movable on the plunger rod, stamp severing blades connected to the stamp severing head having their edges normally projecting beyond the stamp affixing face of the plunger, a stop carried by the stamp severing head projecting beyond the severing edges of the stamp severing blades, stamp holding pins connected to the stamp severing head normally projecting beyond the stamp affixing plunger, means to temporarily lock the plunger and stamp severing head together, said means consisting of a groove formed in the plunger rod, a latch pivoted to the stamp severing head, and a trip dog for the latch.

29. In a stamp affixing machine, a stamp affixing mechanism comprising a plunger, having a stamp affixing face, a plunger rod, a stamp severing head movable on the plunger rod, stamp severing blades connected to the stamp severing head having their edges normally projecting beyond the stamp affixing face of the plunger, a stop carried by the stamp severing head projecting beyond the severing edges of the stamp severing blades, means to temporarily lock the plunger and stamp severing head together, said means consisting of a groove formed in the plunger rod, a latch pivoted to the stamp severing head, a trip dog for the latch, and a spring to engage with the latch.

30. In a stamp affixing machine a stamp affixing mechanism comprising a plunger having a stamp affixing face, a plunger rod, a stamp severing head movable on the plunger rod, stamp severing blades connected to the stamp severing head having their edges normally projecting beyond the stamp affixing face of the plunger, a stop carried by the stamp severing head projecting beyond the severing edges of the stamp severing blades, stamp holding pins connected to the stamp severing head normally projecting beyond the stamp affixing plunger, means to temporarily lock the plunger and stamp severing head together, said means consisting of a groove formed in the plunger rod, a latch pivoted to the stamp severing head, a trip dog for the latch, and a spring to engage with the latch.

31. In a stamp affixing machine, a stamp affixing mechanism comprising a plunger having a stamp affixing face, a plunger rod, a stamp severing head movable on the plunger rod, stamp severing blades connected to the stamp severing head having their edges normally projecting beyond the stamp affixing face of the plunger, a stop carried by the stamp severing head projecting beyond the severing edges of the stamp severing blades, means to temporarily lock the plunger and stamp severing head together, a tension spring engaging at one end with the stamp severing head, and a collar fixed to the plunger rod engaging with the other end of the spring.

32. In a stamp affixing machine, a stamp affixing mechanism comprising a plunger, having a stamp affixing face, a plunger rod, a stamp severing head movable on the plunger rod, stamp severing blades connected to the stamp severing head having their edges normally projecting beyond the stamp affixing face of the plunger, a stop carried by the stamp severing head projecting beyond the severing edges of the stamp severing blades, stamp holding pins connected to the stamp severing head normally projecting beyond the stamp affixing plunger, means to temporarily lock the plunger and stamp severing head together, a collar on the plunger rod, and a tension spring engaging the stamp severing head and collar.

33. A stamp affixing machine comprising an envelop feeder consisting of an elongated slotted arm, and an envelop engaging plate having upturned flanges to engage with the envelops, an oscillating arm, means extending through the slotted arm of the envelop feeder and adjustably connecting it to the oscillating arm, a rock shaft, and means operably connecting the rock shaft with the oscillating arm.

34. A stamp affixing machine comprising an envelop stop consisting of a rock shaft revolubly mounted on the stamp affixing machine, a stopping arm connected to the rock shaft an aperture in the stamp affixing machine for the stopping arm, means for actuating the rock shaft to raise the stopping arm into an upright plane or lower it into a horizontal plane, and a recess extending from the aperture to receive the stopping arm when in its upright plane.

35. A stamp affixing machine comprising an envelop stop consisting of a rock shaft revolubly mounted in the stamp affixing machine, a stopping arm connected to the rock shaft an aperture in the stamp affixing machine for the stopping arm, means for actuating the rock shaft to raise the stopping arm into an upright plane or lower it into a horizontal plane, a recess extending from the aperture to receive the stopping arm when in its upright plane, and a tension spring to hold the stopping arm in the recess.

36. A stamp affixing machine comprising an envelop bed having an aperture therein, an envelop ejector pivotally connected to the stamp affixing machine below the envelop bed, and arranged to operate through the aperture, an arm for the envelop ejector, a swinging lever to engage the ejector arm, a rock shaft, an arm carried by the rock shaft, a trip carried by the last mentioned arm to engage the swinging lever and actuate it to restore the ejector to its normal position.

37. A stamp affixing machine comprising an envelop bed, having an aperture therein, an envelop ejector pivotally connected to the stamp affixing machine below the envelop bed, and arranged to operate through the aperture, an arm for the envelop ejector, a swinging lever to engage the ejector arm, a rock shaft, an arm carried by the rock shaft a trip carried by the last mentioned arm to engage the swinging lever and actuate it to restore the ejector to its normal position, and means to actuate the ejector to deliver the envelop.

38. A stamp affixing machine comprising an envelop bed having an aperture therein, an envelop ejector pivotally connected to the stamp affixing machine below the envelop bed, and arranged to operate through the aperture, an arm for the envelop ejector, a swinging lever to engage the ejector arm, a rock shaft, an arm carried by the rock shaft a trip carried by the last mentioned arm to engage the swinging lever and actuate it to restore the ejector to its normal position, means to actuate the ejector to deliver the envelop, said means consisting of a spring connected to the envelop ejector and to the stamp affixing machine.

39. A stamp affixing machine comprising an envelop bed, having an ejector aperture therein, an ejector fulcrumed to the stamp affixing machine having an oscillating movement in one direction, and a lateral movement transverse to its oscillating movement, means for actuating the ejector to deliver the envelops, a cam for the ejector, a rock shaft an arm for the rock shaft, a trip dog carried by the arm to engage the ejector cam and cause the lateral movement of the ejector, an arm for the ejector, a swinging lever engaging the ejector arm, means carried by the rock shaft arm to actuate the swinging lever to restore the ejector to its normal position and means for actuating the ejector to deliver the envelops.

Toronto, June 13, A. D. 1908.

DANIEL CARTER.

Signed in the presence of—
N. R. ROBERTSON,
H. L. TRIMBLE.